United States Patent
Yamamoto (10) Patent No.: US 6,384,677 B2
(45) Date of Patent: May 7, 2002

(54) POWER AMPLIFIER HAVING NEGATIVE FEEDBACK CIRCUIT FOR TRANSMITTER

(75) Inventor: Hiroyuki Yamamoto, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 09/768,469

(22) Filed: Jan. 25, 2001

(30) Foreign Application Priority Data

Jan. 28, 2000 (JP) ............................................ 12-019878

(51) Int. Cl.$^7$ ................................................ H03F 3/38
(52) U.S. Cl. ...................... 330/10; 330/107; 332/103; 455/126
(58) Field of Search ...................... 330/10, 107; 331/12; 332/103; 327/238, 254, 255; 329/307, 308, 309

(56) References Cited

U.S. PATENT DOCUMENTS

| | | | | |
|---|---|---|---|---|
| 5,448,203 A | * | 9/1995 | Matui et al. | 330/107 |
| 5,469,105 A | * | 11/1995 | Sparks | 455/126 |
| 5,574,994 A | * | 11/1996 | Huang et al. | 455/126 |
| 5,771,263 A | * | 6/1998 | Kanazawa et al. | 332/103 |
| 5,802,451 A | * | 9/1998 | Adachi et al. | 330/107 |

* cited by examiner

Primary Examiner—Robert Pascal
Assistant Examiner—Khanh Van Nguyen
(74) Attorney, Agent, or Firm—Antonelli, Terry, Stout & Kraus, LLP (57) ABSTRACT

Power amplifier circuit incorporating a negative feedback circuit for a transmitter and phase control method therefor. An I-component test signal and an I-component baseband feedback signal are added for generating an I-component summing signal. A Q-component test signal and a Q-component baseband feedback signal are added for generating a Q-component summing signal. A carrier is orthogonally modulated with the I- and Q-component summing signals. A part of the modulated signal is orthogonally demodulated with the carrier, whereby I-component baseband feedback signal and Q-component baseband feedback signal are outputted. Phase of the carrier is changed in accordance with a phase control signal for holding the phase of the carrier at a time when the detected state of one of the i- and Q-component summing signals as selected meets predetermined condition.

11 Claims, 10 Drawing Sheets

| PHASE SHIFTING | PHASE (DEGREE) | MODULATOR INPUT Q' (POLARITY) |
|---|---|---|
| 1st TIME | 0 | + |
| 2nd TIME | 30 | + |
| 3rd TIME | 60 | + |
| 4-th TIME | 90 | + |
| 5-th TIME | 120 | − |
| 6-th TIME | 150 | − |
| 7-th TIME | 180 | − |
| 8-th TIME | 210 | − |
| 9-th TIME | 240 | − |
| 10-th TIME | 270 | − |
| 11-th TIME | 300 | + |
| 12-th TIME | 330 | + |
| 13-th TIME | 360 | + |

FIG.5

| PHASE SHIFTING | PHASE (DEGREE) | MODULATOR INPUT Q' (POLARITY) |
|---|---|---|
| 1st TIME | 270 | + |
| 2nd TIME | 271 | + |
| . . . | . . . | . . . |
| . . . | . . . | . . . |
| . . . | . . . | . . . |
| . . . | . . . | . . . |
| . . . | . . . | . . . |
| 27-th TIME | 296 | − |
| 28-th TIME | 297 | − |
| 29-th TIME | 298 | − |
| 30-th TIME | 299 | + |
| 31-th TIME | 300 | + |

(PRESET VALUE)

| PHASE ANGLE (°) | I-AXIS | Q-AXIS | VOLTAGE FOR I-COMPONENT | VOLTAGE FOR Q-COMPONENT |
|---|---|---|---|---|
| 0 | 1.00000 | 0.00000 | 3.00000 | 2.50000 |
| 1 | 0.99985 | 0.01745 | 2.99992 | 2.50873 |
| 2 | 0.99939 | 0.03490 | 2.99970 | 2.51745 |
| 3 | 0.99863 | 0.05234 | 2.99931 | 2.52617 |
| 4 | 0.99756 | 0.06976 | 2.99878 | 2.53488 |
| 5 | 0.99619 | 0.08716 | 2.99810 | 2.54358 |
| 6 | 0.99452 | 0.10453 | 2.99726 | 2.55226 |
| ⋮ | ⋮ | ⋮ | ⋮ | ⋮ |
| 30 | 0.86603 | 0.50000 | 2.93301 | 2.75000 |
| ⋮ | ⋮ | ⋮ | ⋮ | ⋮ |
| 60 | 0.50000 | 0.86603 | 2.75000 | 2.93301 |
| ⋮ | ⋮ | ⋮ | ⋮ | ⋮ |
| 90 | 0.00000 | 1.00000 | 2.50000 | 3.00000 |
| ⋮ | ⋮ | ⋮ | ⋮ | ⋮ |
| 180 | -1.00000 | -0.00000 | 2.00000 | 2.50000 |
| ⋮ | ⋮ | ⋮ | ⋮ | ⋮ |
| 270 | 0.00000 | -1.00000 | 2.50000 | 2.00000 |
| 271 | 0.01745 | -0.99985 | 2.50873 | 2.00008 |
| 272 | 0.03490 | -0.99939 | 2.51745 | 2.00030 |
| 273 | 0.05234 | -0.99863 | 2.52617 | 2.00069 |
| 274 | 0.06976 | -0.99756 | 2.53488 | 2.00122 |
| 275 | 0.08716 | -0.99619 | 2.54358 | 2.00190 |
| 276 | 0.10453 | -0.99452 | 2.55226 | 2.00274 |
| 277 | 0.12187 | -0.99255 | 2.56093 | 2.00373 |
| 278 | 0.13917 | -0.99027 | 2.56959 | 2.00487 |
| 279 | 0.15643 | -0.98769 | 2.57822 | 2.00616 |
| 280 | 0.17365 | -0.98481 | 2.58682 | 2.00760 |
| 281 | 0.19081 | -0.98163 | 2.59540 | 2.00919 |
| 282 | 0.20791 | -0.97815 | 2.60396 | 2.01093 |
| 283 | 0.22495 | -0.97437 | 2.61248 | 2.01281 |
| 284 | 0.24192 | -0.97030 | 2.62096 | 2.01485 |
| 285 | 0.25882 | -0.96593 | 2.62941 | 2.01704 |
| 286 | 0.27564 | -0.96126 | 2.63782 | 2.01937 |
| 287 | 0.29237 | -0.95630 | 2.64619 | 2.02185 |
| 288 | 0.30902 | -0.95106 | 2.65451 | 2.02447 |
| 289 | 0.32557 | -0.94552 | 2.66278 | 2.02724 |
| 290 | 0.34202 | -0.93969 | 2.67101 | 2.03015 |

FIG.10B

| PHASE ANGLE (°) | I-AXIS | Q-AXIS | VOLTAGE FOR I-COMPONENT | VOLTAGE FOR Q-COMPONENT |
|---|---|---|---|---|
| 291 | 0.35837 | -0.93358 | 2.67918 | 2.03321 |
| 292 | 0.37461 | -0.92718 | 2.68730 | 2.03641 |
| 293 | 0.39073 | -0.92050 | 2.69537 | 2.03975 |
| 294 | 0.40674 | -0.91355 | 2.70337 | 2.04323 |
| 295 | 0.42262 | -0.90631 | 2.71131 | 2.04685 |
| 296 | 0.43837 | -0.89879 | 2.71919 | 2.05060 |
| 297 | 0.45399 | -0.89101 | 2.72700 | 2.05450 |
| 298 | 0.46947 | -0.88295 | 2.73474 | 2.05853 |
| 299 | 0.48481 | -0.87462 | 2.74240 | 2.06269 |
| 300 | 0.50000 | -0.86603 | 2.75000 | 2.06699 |
| ⋮ | ⋮ | ⋮ | ⋮ | ⋮ |
| 330 | 0.86603 | -0.50000 | 2.93301 | 2.25000 |
| ⋮ | ⋮ | ⋮ | ⋮ | ⋮ |
| 350 | 0.98481 | -0.17365 | 2.99240 | 2.41318 |
| 351 | 0.98769 | -0.15643 | 2.99384 | 2.42178 |
| 352 | 0.99027 | -0.13917 | 2.99513 | 2.43041 |
| 353 | 0.99255 | -0.12187 | 2.99627 | 2.43907 |
| 354 | 0.99452 | -0.10453 | 2.99726 | 2.44774 |
| 355 | 0.99619 | -0.08716 | 2.99810 | 2.45642 |
| 356 | 0.99756 | -0.06976 | 2.99878 | 2.46512 |
| 357 | 0.99863 | -0.05234 | 2.99931 | 2.47383 |
| 358 | 0.99939 | -0.03490 | 2.99970 | 2.48255 |
| 359 | 0.99985 | -0.01745 | 2.99992 | 2.49127 |
| 360 | 1.00000 | -0.00000 | 3.00000 | 2.50000 |

POWER AMPLIFIER HAVING NEGATIVE FEEDBACK CIRCUIT FOR TRANSMITTER

CROSS-REFERENCE TO RELATED APPLICATION

The present application relates to subject matters described in co-pending application Ser. No. 09/672,688 filed on Sep. 29, 2000.

BACKGROUND OF THE INVENTION

The present invention generally relates to a transmitter. More particularly, the present invention is concerned with a negative feedback amplifier circuit employed in the transmitter of digital modulation type for compensating for nonlinear distortions. Further, the invention is also concerned with a method of controlling the phase of the negative feedback amplifier circuit.

In radio systems in which a linear digital modulation system such as, for example, 16QAM (Quadrature Amplitude Modulation), π/4 shift QPSK (Quadrature Phase Shift Keying) or the like is employed, it is indispensably required to compensate for nonlinear distortion of a power amplifier. To this end, a variety of nonlinear distortion compensating systems (linearizers) are proposed for practical application. Among them, a Cartesian loop negative feedback type linearizer has been conventionally employed long since. For having better understanding of the background techniques of the present invention, description will first be made in some detail of the conventional linear feedback amplifier known heretofore by reference to FIG. 2 which is a block diagram showing an arrangement of a transmitting section of a digital radio system provided with a Cartesian loop negative feedback type linearizer.

Figure 2:
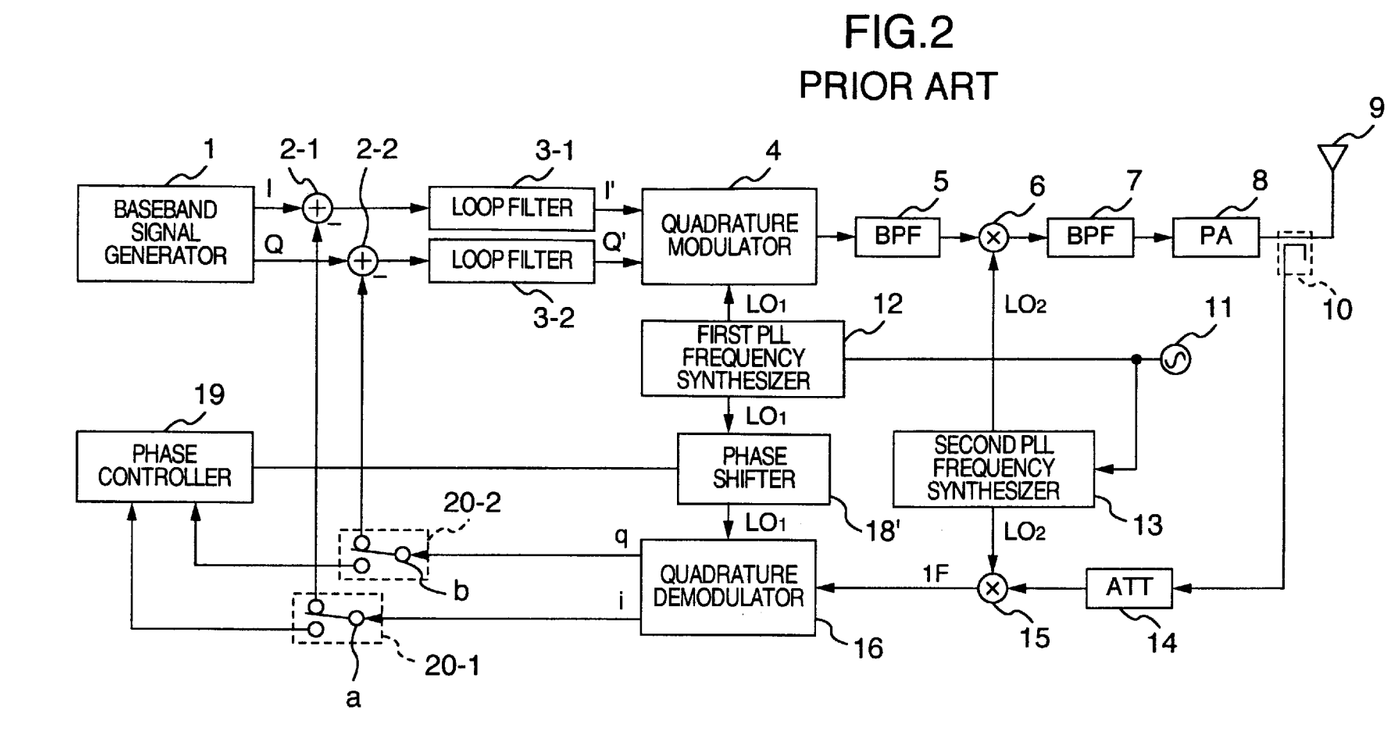
FIG. 2 is a block diagram showing a structure of a negative feedback amplifier for a power amplifier circuit known heretofore.

Referring to FIG. 2, reference numeral 1 denotes a baseband signal generator which is designed to output an in-phase component (hereinafter referred to simply as the I-component) and a quadrature component (hereinafter referred to simply as the Q-component) of a baseband signal. The I-component is added with a corresponding feedback signal by an adder 2-1, the output of which is supplied to a loop filter 3-1. Likewise, the Q-component is added with a corresponding feedback signal by an adder 2-2, the output signal of which is applied to a loop filter 3-2. The loop filers 3-1 and 3-2 operate to limit the bandwidths of the inputted I-component and the inputted Q-component, respectively. The I- and Q-components undergone the bandwidth limitation are then inputted to a quadrature modulator 4, as indicated by I' and Q', respectively.

A numeral 11 denotes a reference signal generator which is designed to generate a reference frequency signal which is then supplied to the first and second PLL frequency synthesizers 12 and 13, respectively. The PLL frequency synthesizer 12 is designed to generate a first local oscillation signal (hereinafter referred to as the first LO1 signal) on the basis of the reference frequency signal. The first LO1 signal is then supplied to a quadrature modulator 4 and a phase shifter 18. On the other hand, the PLL frequency synthesizer 13 generates a second local oscillation signal (hereinafter referred to as the second LO2 signal) on the basis of the reference signal. The second LO2 signal is supplied to mixers 6 and 15, respectively. The phase shifter 18 controls the phase of the first LO1 signal in conformance with a control signal supplied from a phase controller 19. The first LO1 signal undergone the phase control is then supplied to a quadrature demodulator 16.

The quadrature modulator 4 serves to orthogonally modulate the first LO1 signal (a carrier signal) into a signal of an intermediate frequency band (hereinafter referred to as the IF frequency band) with the I-component I' and the Q-component Q' of the baseband signal inputted to the quadrature modulator 4. Then, the modulated signal is applied to a bandpass filter (BPF) 5. The bandpass filter 5 operates to eliminate unnecessary components from the modulated signal. The output signal of the bandpass filter 5 is then applied to the mixer 6. The mixer 6 operates to convert the modulated signal applied therein into a signal of a desired frequency by making use of the second LO2 signal outputted from the PLL frequency synthesizer 13. The output signal of the mixer 6 is then applied to a bandpass filter (BPF) 7. The bandpass filter 7 serves to eliminate unnecessary spurious components from the signal inputted. The output of the bandpass filter 7 is then inputted to the amplifying circuit (PA) 8 which operates to amplify the input signal to a specified or rated output level for transmission by way of an antenna 9.

Since the negative feedback amplifier described above is implemented in the form of the negative feedback linearizer based on the Cartesian loop, a part of the output signal of the amplifying circuit 8 is fed back to the input-side circuitry to be supplied to an attenuator (ATT) 14 through the medium of a directivity coupler 10. In response, the attenuator 14 operates to regulate the power level of the input signal to a proper value. The output of the attenuator 14 is supplied to the mixer 15. The mixer 15 then converts the frequency of the signal inputted from the attenuator 14 to an IF frequency by using the second LO2 signal. The IF frequency signal is then supplied to the quadrature demodulator 16.

The quadrature demodulator 16 operates to divide the inputted IF signal into two IF signals having 90°-phase shifted from each other and produce baseband signals i and q of the I-component and the Q-component, respectively, by making frequency conversion of two IF signals with the first LO1 signal inputted from the phase shifter 18 which has undergone the phase control. The I-component is applied to a subtracting or minus input terminal of the adder 2-1 as the I-component baseband signal i for feedback by way of a switch 20-1, while the Q-component is applied to a subtracting or minus input terminal of the adder 2-2 as the Q-component baseband signal q for feedback by way of a switch 20-2. In this manner, feedback operation is performed on the I-component and the Q-component, respectively. At this time, the input terminals a and b of the switches 20-1 and 20-2 are connected to the first and second adders 2-1 and 2-2, respectively.

In this negative feedback amplifier circuit, it is required for the purpose of circuit stabilization that the input signals I and Q on one hand and the feedback signals i and q on the other hand are in phase, respectively, (i.e., phase difference= 0°) on the input side of the adders 2-1 and 2-2. To say in another way, in case phase difference takes place between the input signals and the feedback signals, it is required that such control be carried out that the phase of the first LO signal inputted to the quadrature demodulator 16 can be adjusted by 180° (π radian) at maximum by means of the phase shifter 18 in order to make the phases of the input signals coincide with those of the feedback signals in the adders 2-1 and 2-2, respectively.

At this juncture, a phase control method will be described below. Initially, the switches 20-1 and 20-2 shown in FIG. 2 are set to such positions that the outputs q and i of the quadrature demodulator 16 are supplied to the phase controller 19 with the feedback loop being in the opened state.

In this state, in the baseband signal generator 1, a predetermined DC voltage is given to only the I-component for the purpose of phase adjustment while the Q-component being held zero (Q=0), whereon the quadrature modulation is carried out straightforwardly for signal transmission by way of the antenna 9 in accordance with the procedure described previously. In that case, the output waveform of the amplifying circuit 8 assumes the waveform of the non-modulated carrier signal. Such being the circumstances, when a part of the output of the amplifying circuit 8 is fed back by way of the directivity coupler 10, then the DC voltage makes appearance only for the I-component of the feedback signal outputted from the quadrature demodulator 16 while no DC voltage makes appearance for the Q-component so long as the feedback signals i and q outputted from the quadrature demodulator 16 are in phase with each other. By contrast, when the output signals i and q of the quadrature demodulator 16 are out of phase with each other, a DC voltage corresponding to the phase deviation between these output signals appears on the side of the Q-component. Thus, the angle of rotation corresponding to the phase deviation can be determined on the basis of the DC voltages of the I-component and the Q-component.

In the phase controller 19, the phase corresponding to the angle of rotation as determined is rotated in the direction reverse to that of the phase deviation by controlling correspondingly the phase shifter 18 to thereby adjust the phase of the first LO1 signal so that the phases of the feedback signals outputted from the quadrature demodulator 16 are in phase with the phases of the input signals. In this manner, the negative feedback loop can be stabilized. When the phases of the input signals coincide with those of the feedback signals, the output of the Q-component becomes zero. Thus, the switches 20-1 and 20-2 can be changed over to the adders 2-1 and 2-2, respectively, at this time point. Now, the closed loop operation becomes effective.

As will now be understood from the foregoing, in the case of the conventional negative feedback power amplifier, the feedback loop has to be opened every time the phase adjusting operation is to be effectuated. However, so long as the transmitter is operating continuously, the feedback loop remains in the closed state. Consequently, the phase adjustment cannot be performed for the change of phase during the transmitting operation. Besides, the switches 20-1 and 20-2 are employed for opening/closing the feedback loop, and the phase is controlled on the basis of the DC voltage of the feedback signal on the input side of the these change-over switches. Consequently, it is required to perform offset adjustment on the input side of the change-over switches. In this conjunction, it is however noted that when the feedback loop is closed by means of the switches 20-1 and 20-2 after adjustment of the offset voltage in the open loop state, the offset voltage will become deviated from the adjusted level due to voltage drops brought about by turn-on resistances across the switches 20-1 and 20-2, respectively. In other words, the offset adjustment can not accurately be performed, which of course means that the phase control with sufficient accuracy is practically impossible.

If the transmitting operation is continued with the offset remaining as it is, then the DC offset which is one of the transmission performance factors will undergo deterioration. Furthermore, when the initial phase setting is performed with the offset remaining deviated, the transmitting operation is carried out with the phase being left mismatched. As a result of this, sufficient phase margin can no more be assured, presenting a cause for generation of spurious components, leading ultimately to deterioration of the transmission characteristics.

In Gailus et al's, U.S. Pat. No. 5,066,923 issued on Nov. 19, 19991, there is disclosed a method of performing the phase adjustment by opening the feedback loop in such manner as described above by reference to FIG. 2. Furthermore, in the specification of Japanese Patent No. 2746133 assigned to NEC corporation, a technique for adjusting the phase in the closed loop state is disclosed. However, the technique taught by the patent mentioned just above, both the I-component and the Q-component are required indispensably as the feedback signals for effectuating the phase adjustment, wherein phase comparison of the input baseband I-component with the feedback I-component as well as the phase comparison of the input baseband Q-component with the feedback Q-component has to be carried out, which will incur much complication in the circuit configuration, needless to say.

SUMMARY OF THE INVENTION

In the light of the state of the art described above, it is an object of the present invention to provide a power amplifier circuit incorporating a negative feedback circuit for a transmitter, which is so arranged that the phase adjustment can be performed without need for opening the feedback loop with a simplified circuit configuration while protecting the transmission characteristics against deterioration and thus ensuring constantly stable output operation characteristics.

Another object of the present invention is provide a phase control method for the power amplifier circuit mentioned above.

In view of the above and other object which will become apparent as the description proceeds, there is provided according to an aspect of the present invention a power amplifier circuit and a phase control method for the same, the gist of which resides in that an I-component test signal for an I-component baseband signal and a Q-component test signal for a Q-component baseband signal are supplied as inputs to a feedback loop. The I-component test signal and an I-component baseband feedback signal are added together by an adder to generate an I-component summing signal while the Q-component test signal and a Q-component baseband feedback signal are added together by another adder for generating a Q-component summing signal. A quadrature modulator orthogonally modulates a carrier signal generated by an oscillator with the I-component summing signal and the Q-component summing signal. A power amplifier amplifies the orthogonally modulated signal. A quadrature demodulator orthogonally demodulates the orthogonally modulated signal by using a part of the amplified signal and the carrier signal to thereby generate an I-component baseband feedback signal and a Q-component baseband feedback signal. The quadrature modulator changes the phase of the carrier signal generated by the oscillator in accordance with a phase control signal. A phase controller compares either one of the I-component summing signal or the Q-component summing signal as selected with a reference signal to thereby generate a signal indicative of result of the comparison. Further the phase controller generates the phase control signal for changing sequentially and incrementally the phase of the carrier signal in a predetermined direction. The phase of the carrier signal is fixed at the time point when the signal indicative of result of the comparison meets a predetermined condition in the course of changing the phase of the carrier signal.

To say in another way, in the state where the feedback loop is operating with the test signals being inputted thereto, the phase of the carrier signal is changed gradually or incrementally while monitoring the signals inputted to the quadrature modulator. Then, the operating condition under which the phases of the input baseband signals coincide with those of the feedback signals can be detected without fail. The phase of the carrier signal is then fixed to the phase value corresponding to the time point at which the operating condition mentioned above is detected. Subsequently, the ordinary transmitting operation can be carried out with the fixed phase.

In a preferred mode for carrying out the phase control method according to the present invention, DC voltages differing each other may be used as the I-component test signal and the Q-component test signal, respectively. By way of example, the DC voltages which satisfy the conditions that I=1 and Q=0 in an I-Q orthogonal coordinate system can be employed as the I- and Q-baseband signal inputs, respectively. The voltage value of either the I-component signal or the Q-component signal inputted to the quadrature modulator is compared with a reference voltage value (which meets the conditions that I=0 and that Q=0) in the course of rotating the phase of the carrier signal clockwise or counterclockwise in the I-Q orthogonal coordinate system, to thereby acquire a polarity signal which can assume positive (plus) polarity or negative (minus) polarity. By detecting the time point at which the polarity signal changes from the plus to minus polarity or vice versa (i.e., the time point when the conditions that I=1 and that Q=0 are met), it is possible to detect the point at which the phases of the input I- and Q-component signals coincide with those of the feedback signals, respectively.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE EMBODIMENTS

The present invention will be described in detail in conjunction with what is presently considered as preferred or typical embodiments thereof by reference to the drawings.

Figure 1:
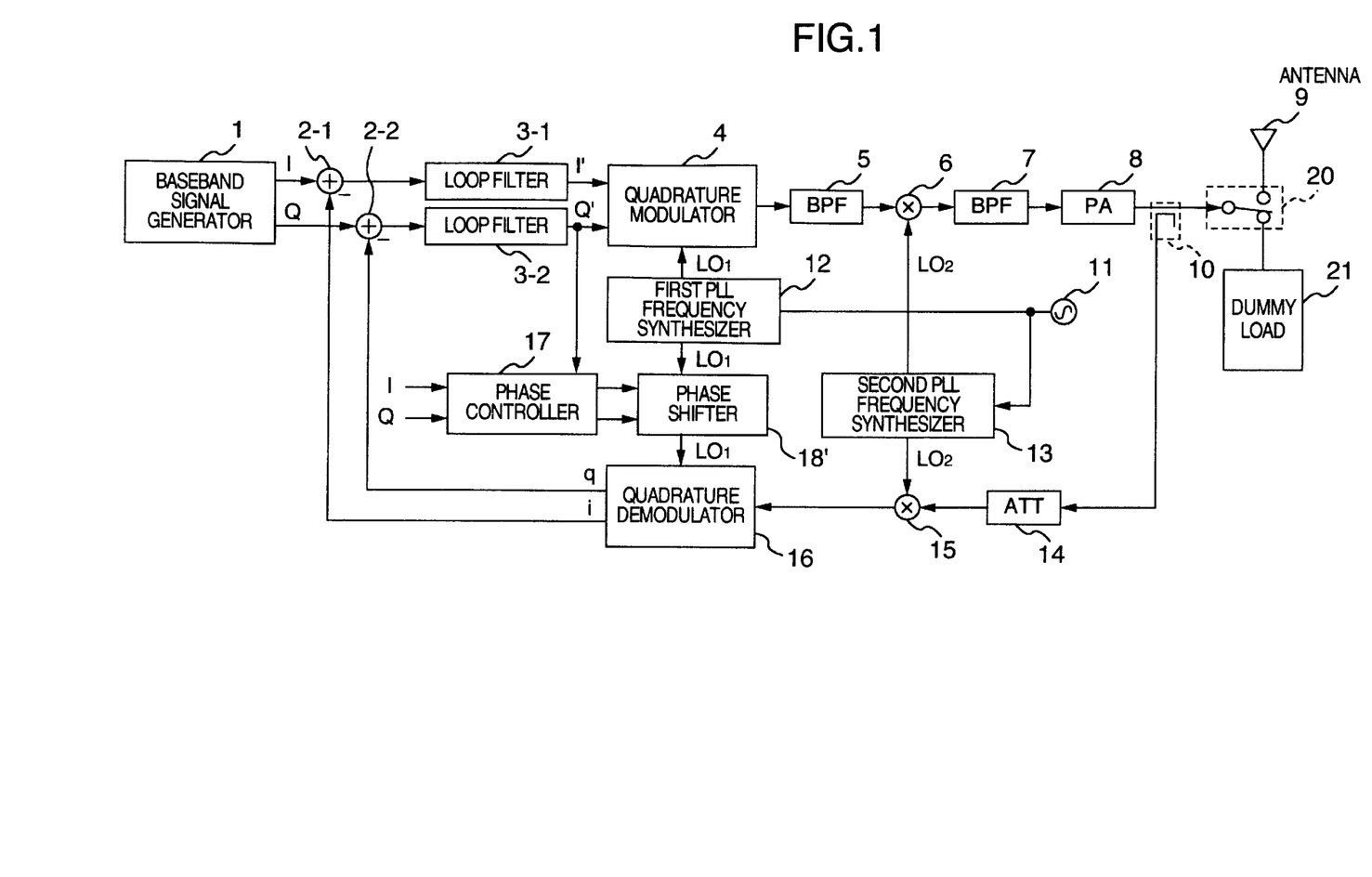
FIG. 1 is a block diagram showing a circuit arrangement of a negative feedback amplifier for a power amplifier circuit according to an exemplary embodiment of the present invention.

FIG. 1 is a block diagram showing a circuit configuration of a negative feedback amplifier constituting a transmitting section of a digital radio transmitter according to a first embodiment of the present invention. In this figure, components which serve for the functions same as or equivalent to those described previously be reference to FIG. 2 are denoted by like reference characters. In the negative feedback amplifier shown in FIG. 1, reference numeral 17 denotes a phase controller, 18' denotes a phase shifter, numeral 20 denotes a switch, and reference numeral 21 denotes a dummy load.

Referring to FIG. 2, a baseband signal generator 1 is designed to output an I-component and a Q-component of a baseband signal. The I-component is added with a corresponding feedback signal i by an adder 2-1, the output of which is then applied to a loop filter 3-1. Similarly, the Q-component is added with a corresponding feedback signal q by means of an adder 2-2, the output signal of which is then applied to a loop filter 3-2. The loop filer 3-1 operates to limit the bandwidth of the I-component inputted. An I-component signal I' resulting from the bandwidth limitation is supplied to a quadrature modulator 4. Similarly, the loop filter 3-2 operates to limit the bandwidth of the Q-component. A Q-component signal Q' resulting from the bandwidth limitation is then inputted to the quadrature modulator 4 as well.

A reference signal generator 11 is designed to generate a reference frequency signal which is then supplied to first and second PLL (Phase Locked Loop) frequency synthesizers 12 and 13, respectively. The first PLL frequency synthesizer 12 operates to generate a first LO1 signal on the basis of the reference signal. The first LO1 signal is then supplied to the quadrature modulator 4 and the phase shifter 18'. On the other hand, the second PLL frequency synthesizer 13 generates a second LO2 signal on the basis of the reference signal. The second LO2 signal is then supplied to mixers 6 and 15, respectively. The phase shifter 18' is designed to control the phase of the first LO1 signal supplied from the first PLL frequency synthesizer 12 in conformance with a control signal (carrying phase difference information and phase lag/lead information) which is supplied from the phase controller 17. The first LO1 signal undergone the phase control is then supplied to a quadrature demodulator 16.

The quadrature modulator 4 serves to orthogonally modulate the I-component I' and the Q-component Q' of the inputted baseband signals into IF signal of an IF frequency band on the basis of the frequency of the first LO1 signal. The modulated signal is applied to a bandpass filter 5. The bandpass filter 5 operates to eliminate unnecessary components from the modulated signal. The output signal of the bandpass filter 5 is then applied to the mixer 6. The mixer 6 operates to convert the inputted modulated signal into a signal of a desired frequency by using the second LO2 signal outputted from the second PLL frequency synthesizer 13. The output signal of the mixer 6 is then applied to a bandpass filter (BPF) 7. The bandpass filter 7 serves to eliminate unnecessary spurious components from the applied signal. The output of the bandpass filter 7 is then inputted to a power amplifying circuit (PA) 8 which operates to amplify the input signal to a specified output level for transmission through an antenna 9.

Since the negative feedback amplifier now under consideration is implemented in the form of a negative feedback linearizer based on the Cartesian loop, a part of the output signal of the amplifying circuit 8 is fed back to an attenuator 14 through a directivity coupler 10. In response, the attenuator 14 regulates the power level of the input signal to a proper value, whereon the output of the attenuator 14 is supplied to the mixer 15. The mixer 15 then converts the signal inputted from the attenuator 14 to an IF frequency with the aid of the second LO2 signal. The resulting IF frequency signal is then supplied to the quadrature demodulator 16.

The quadrature demodulator 16 operates to divide the inputted IF signal into two IF signals having 90°-phase shifted from each other and produce the baseband signals i and q of the I- and the Q-components, respectively, by making frequency conversion of two IF signals with the first LO1 signal inputted from the phase shifter 18' after phase control. The I-component signal i is then applied to a subtracting or minus input terminal of the adder 2-1 as the I-component of the feedback signal, while the Q-component signal q is applied to a subtracting or minus input terminal of the adder 2-2 as the Q-component of the feedback signal. In this manner, negative feedback is effectuated for the I-component and the Q-component, respectively.

Figure 3:
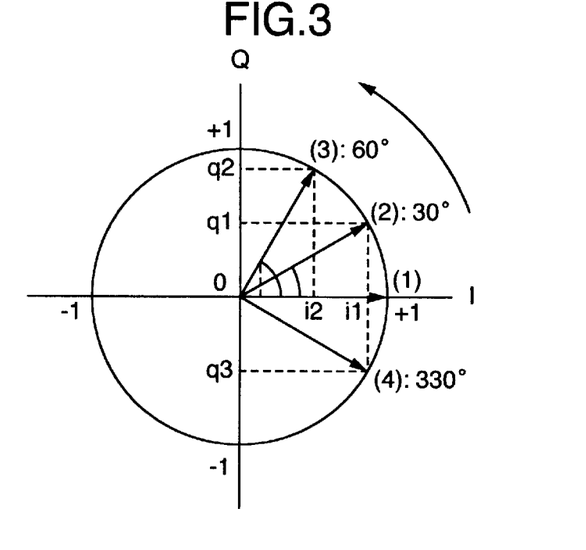
FIG. 3 is a view showing schematically an I-Q orthogonal coordinate system for illustrating the concept of a phase control scheme taught by the present invention.
Figure 4:
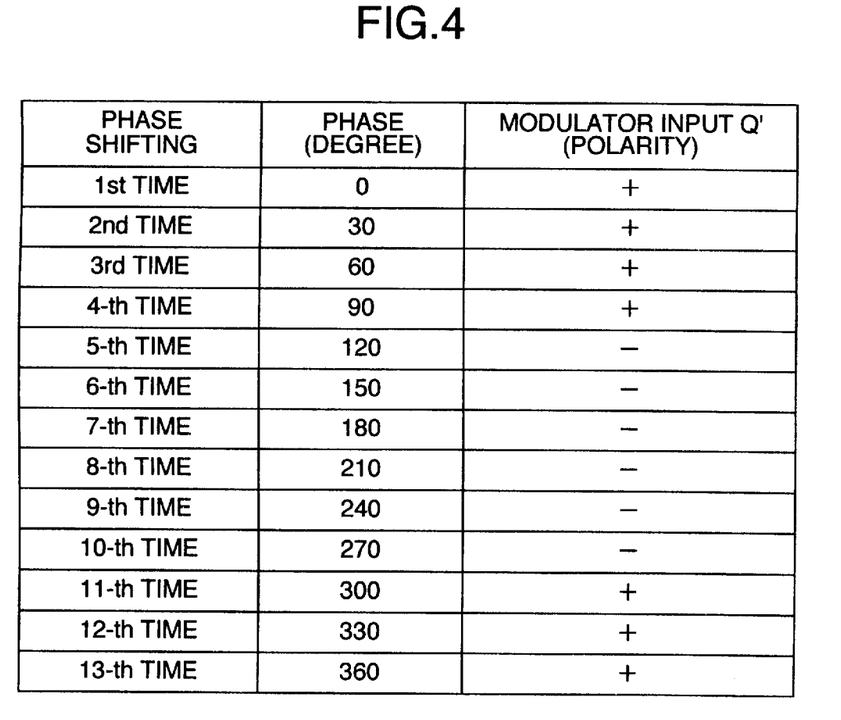
FIG. 4 is a view showing a data table for illustrating an exemplary phase control operation in the negative feedback amplifier according to an embodiment of the present invention.
Figure 5:
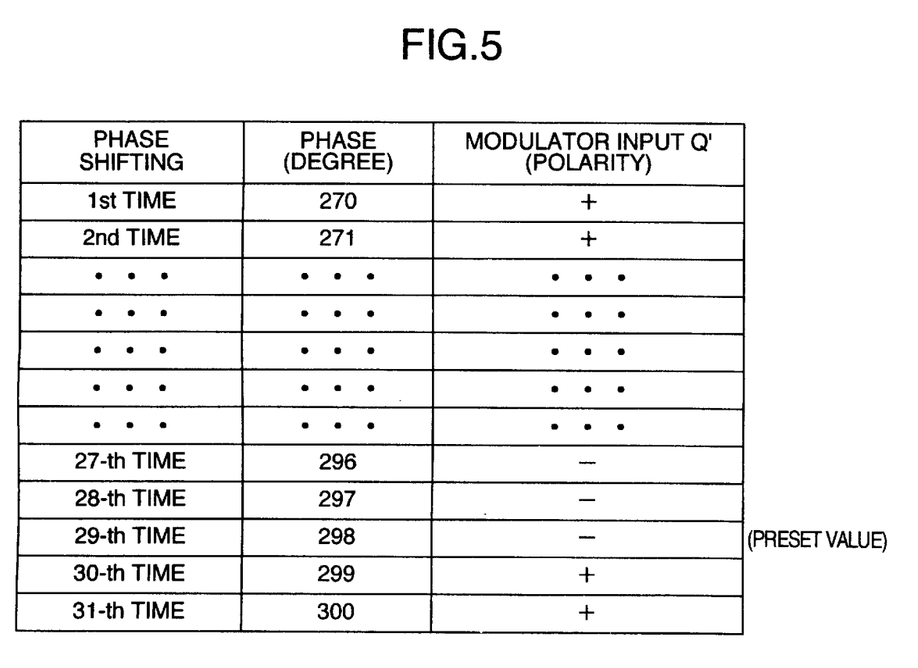
FIG. 5 is a view for illustrating an exemplary phase control operation according to another embodiment of the present invention.

Next, description will be directed to a loop phase adjusting method by reference to FIG. 1 together with FIGS. 3 to 5. FIG. 3 is a view for illustrating a phase control scheme according to an embodiment of the present invention on an I-Q coordinate system plane in which the I-component is taken along the abscissa with the Q-component being taken along the ordinate.

The phase shifter 18' adjusts or shifts the phase of a carrier signal LO1 supplied from the first PLL frequency synthesizer 12 in conformance with a phase control signal supplied from the phase controller 17. The phase-adjusted carrier signal is supplied to the quadrature demodulator 16. The phase control signal outputted from the phase controller 17 indicates the DC voltage of the I- and Q-components for realizing the desired phase value.

It is presumed that the power source for the circuit operation of the phase shifter 18' is constituted, by way of example, by a single power supply of +5 volts. Consequently, the signal operative range is from 0 (zero) to 5 volts. For making available a maximum signal dynamic range, arrangement should be made such that the signal is operative around a center level of 2.5 volts. In that case, the voltage level of 2.5 volts serves as a reference voltage level. In other words, the signal behaves with reference to the voltage of 2.5 volts. In the following description directed to operation of the negative feedback amplifier, it is assumed for the convenience of description that the circuit operation is performed, being based on the reference voltage of 2.5 volts. Further, the DC voltage (phase control signal) applied to the phase shifter 18' is assumed to lie within the range of 2 to 3 volts (reference voltage±0.5 volt).

Figure 10A:
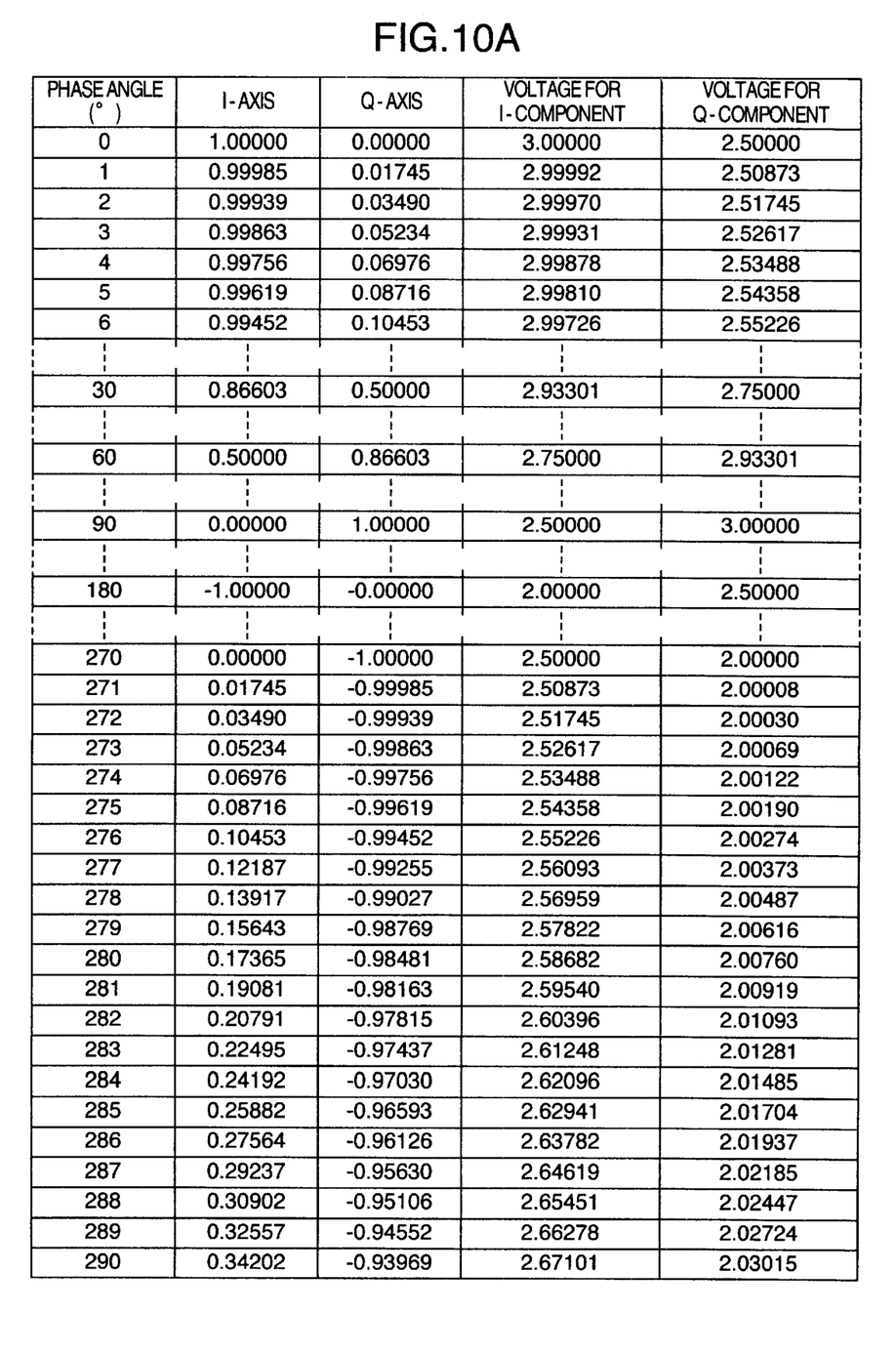
FIGS. 10A and 10B show a table indicating a phase-versus-voltage value table which is referenced in carrying out the phase control according to an embodiment of the present invention.

Referring to FIG. 3, assuming in the I-Q coordinate system illustrated therein that I=1 and that Q=0 (see (1) in FIG. 3), by way of example, then it applies valid that I=3 volts with Q being 2.5 volts in terms of the phase control DC voltage shown in FIG. 10A. By supplying such DC voltages to the phase shifter 18', the carrier signal of the initial phase angle of 0° can be obtained. Similarly, in the case where I=i1=0.866 with Q=q1=0.5 (see (2) in FIG. 3), then I=2.933 volts with Q=2.75 volts in terms of the phase control DC voltage. In this case, the carrier signal of the initial phase angle of 30° can be produced. Further, in the case where I=i2=0.500 with Q=q2=0.866 (see (3) in FIG. 3), then I=2.750 volts with Q=2.933 volts in terms of the phase control DC voltage. In this case, the carrier signal of the initial phase angle of 60° can be obtained. Furthermore, in the case where I=i1=0.866 with Q=q3=−0.5 (see (4) in FIG. 3), then I=2.933 volts with Q=2.25 volts in terms of the phase control DC voltage. In this case, the carrier signal of the initial phase angle of 30° can be obtained. In the negative feedback amplifier according to the embodiment of the invention now under consideration, it is checked in what manner the voltage of the input Q' to the quadrature modulator 4 changes relative to the reference signal when the phase is sequentially changed stepwise or incrementally by applying the DC voltage to the phase shifter 18' from the phase controller 17 so that the initial phase of the carrier signal LO1 is obtained every 30°, i.e., on a 30°-by-30° basis.

More specifically, the voltage value of either one of the I-component signal and the Q-component signal inputted to the quadrature modulator 4 is compared with the reference voltage value of 2.5 V (on the conditions that I=0 and that Q=0) by means of a comparator (described later on) while rotating the phase of the carrier signal LO1 clockwise or counterclockwise on a 30°-by-30° basis in the I-Q orthogonal coordinate system, to thereby derive a polarity signal indicative of positive (plus) polarity or negative (minus) polarity in dependence on the result of the comparison. In this case, by detecting the time point at which the polarity signal changes from plus to minus polarity or vice versa (i.e., at the time point when the conditions that I=1 and that Q=0 is satisfied, to say in another way), it is possible to detect the point at which the phase of the input I-/Q-component signal coincides with that of the feedback signal.

FIGS. 4 and 5 are views for illustrating, by way of example, phase control operations, in which FIG. 4 illustrates an exemplary phase control operation when the phase is changed every 30° or on a 30°-by-30° basis, while FIG. 5 illustrates another exemplary control operation when the phase is changed every 1° (or on a 1°-by-1° basis).

At first, the negative feedback amplifier is set to a test mode. More specifically, referring to FIG. 1, the output of the power amplifying circuit (PA) 8 is coupled to the dummy load 21 by changing over correspondingly the switch 20 to thereby set the state in which no electromagnetic wave is radiated from the antenna 9. Subsequently, DC voltage signals (test signals) I=3 V (volts) and Q=2.5 V (volts) are outputted from the baseband signal generator 1. Additionally, a phase control signal (described in detail hereinafter) is supplied to the phase shifter 18' from the phase controller 17 so that the phase shift quantity of the carrier signal LO1 is changed under the control of the phase shifter 18'.

To this end, the phase is changed or shifted, for example, on a 30°-by-30° basis within a range extending from 0° to 360°, as is illustrated in FIG. 3, and the signal Q' is fetched from the Q-component input terminal of the quadrature modulator 4 at the time point when the phase is changed. In other words, the output of the loop filter 3-2 is detected by the phase controller 17 to thereby check which of plus (+) or minus (−) polarity the DC voltage signal assumes relative to the reference voltage of 2.5 V (volts). In that case, the phase coincidence point is found at the time point at which the signal Q changes from a minus (−) value to a plus (+) value with reference to the reference voltage of 2.5 V.

In more concrete, unless the phase deviation of the feedback signal takes place when the test signals I=3 V (volts) and Q=2.5 V (volts) are supplied to the feedback loop, this corresponds to the case illustrated in FIG. 3 at (1) where I=1 and Q=0 in the I-Q orthogonal coordinate system. By comparing the voltage value of the Q-component signal Q' inputted to the quadrature modulator with the reference voltage of 2.5 volts (satisfying the conditions that I=0 and Q=0) while rotating successively or sequentially the phase of the carrier signal LO1 counterclockwise on a 30°-by-30° basis (i.e., by 30° incrementally or stepwise) in the I-Q orthogonal coordinate system, the plus (+) polarity signal is obtained when the voltage value of the Q-component signal Q' is higher than 2.5 volts whereas the minus (−) polarity signal is obtained when the voltage value of the Q-component signal Q' is lower than 2.5 volts. In the negative feedback amplifier according to the instant embodiment of the invention, change of the polarity signal from minus (−) polarity to plus (+) polarity means that the Q-component signal Q' passes through the point where I=1 and Q=0. Detection of this point by means of the phase controller 17 indicates that there exists a point at which the phases of the input signals of the I-component and the Q-component coincide with the phases of the corresponding feedback signals.

Next, circuit structures and operations of the phase shifter 18' and the phase controller 17 of the negative feedback amplifier according to the instant embodiment will be described in more detail by reference to FIGS. 6A and 6B and FIG. 7.

Figure 6A:
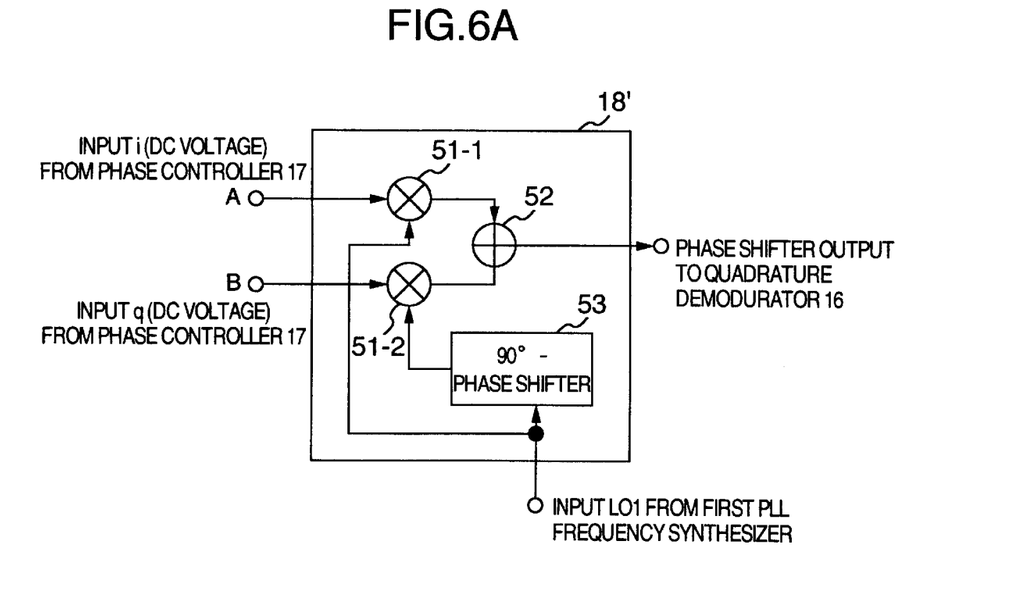
FIG. 6A is a block diagram showing an exemplary circuit structure of a phase shifter according to an embodiment of the present invention.
Figure 7:
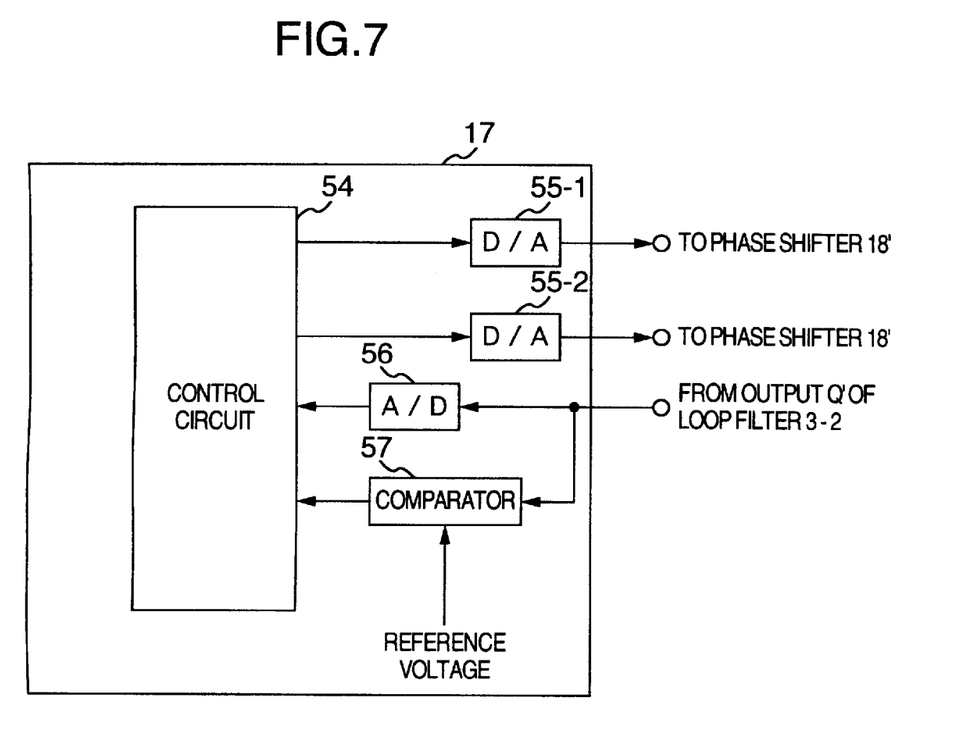
FIG. 7 is a block diagram showing an exemplary circuit structure of a phase controller incorporated in the power amplifier circuit according to an embodiment of the present invention.

As can be seen in the block diagram shown in FIG. 6A, the phase shifter 18' is implemented in a structure of a so-called quadrature modulator comprised of two mixers 51-1 and 51-2, an adder 52 and a 90°-phase shifter 53. At this juncture, the input i is represented by "A" (in terms of DC voltage), the input q is represented by "B" (in terms of DC voltage), the input to the mixer 51-1 for the i-channel from the first PLL frequency synthesizer 12 is represented by "cos(ωt)", the input to the mixer 51-2 q-channel from the 90°-phase shifter 53 is represented by "−sin(ωt)". Then, the output of the phase shifter 18' can be given by the undermentioned expression (1).

$$A \cdot \cos(\omega t) - B \cdot \sin(\omega t) \quad (1)$$

In view of the trigonometric function composition formula well known in the art, the above expression (1) can be rewritten as follows:

$$\sqrt{A^2+B^2} \cdot \cos(\omega t + \beta) \quad (2)$$

where ω represents an angular frequency given by $$\sin(\beta) = \frac{A}{\sqrt{A^2+B^2}}$$

Thus, it can readily be understood that the initial phase β of the carrier signal LO1 can be set arbitrarily in dependence on the DC voltage level and thus the phase can be made changeable.

Figure 6B:
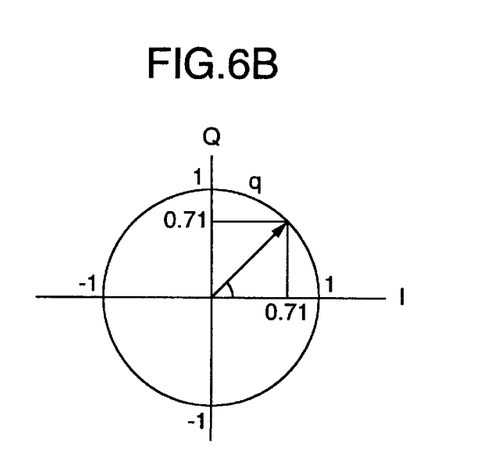
FIG. 6B is a view showing schematically an I-Q orthogonal coordinate system for illustrating phase shift control operation performed by the phase shifter for a carrier signal.

By way of example, in the case where i=0.71 and q=0.71 as illustrated in the I-Q orthogonal coordinate system shown in FIG. 6B, the carrier signal having the initial phase of 45° can be obtained which is, for example, equivalent to the case where i=3 volts with q=3 volts in terms of the DC voltage.

Next, referring to the block diagram shown in FIG. 7, description will be made in detail of an exemplary circuit structure of the phase controller 17. The phase controller 17 is comprised of a control circuit 54, D/A (digital-to-analog) converters 55-1 and 55-2, an A/D (analog-to-digital) converter 56 and a comparator 57. The control circuit 54 may be realized by using a conventional microcomputer, digital signal processor (or DSP) or programmable logical operation circuit.

In the test mode, the output Q' of the loop filter 3-2 is compared with the reference voltage by means of the comparator 57. When the Q-component signal Q' is at a higher voltage value than the reference voltage, the output of the comparator 57 is "High (+)". Otherwise, the output of the comparator 57 is "Low (−)". A part of the output from the loop filter 3-2 is inputted to the A/D converter 56.

Figure 10B:
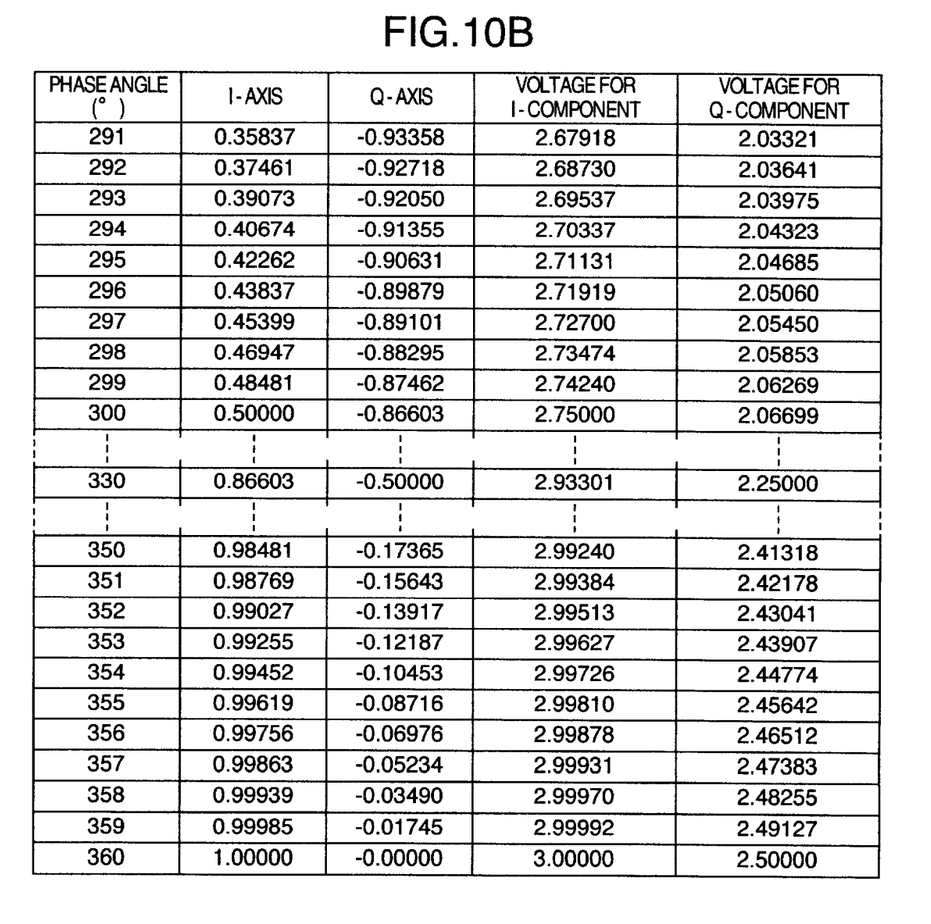

Relations between the DC voltages and the phase angles are stored in a memory (not shown) incorporated in the control circuit in the form of a data table structure such as illustrated in FIGS. 10A–10B.

The phase controller 17 generates DC voltages for the I-component and the Q-component which are phase control signals supplied to the phase shifter 18'. The control circuit 54 is so designed as to generate a digital signal for changing or shifting the phase angle (30° by 30° in the illustrated case, i.e. coarse regulating operation) on the basis of the contents of the data table shown in FIGS. 10A–10B. The D/A converters 55-1 and 55-2 cooperate to set the DC analog voltage such that the initial phase assumes the phase angle designated by the control signal.

The phase controller 17 is also so designated or programmed as to store the value of the control phase angle at the time point when the output value of the comparator 57 changes from "Low" to "High". Additionally, within the range in which the phase angle as stored changes, the phase angle is caused to change on a smaller phase angle basis (e.g. on a 1°-by-1° basis, i.e. fine regulating operation) similarly by referencing the data table shown in FIGS. 10A–10B, to thereby store as the initial value (initialized value) the control phase angle corresponding to the time point when the output value of the comparator 57 changes to "High" from "Low".

The initial value is held or stored in the control circuit 54 even after completion of the test mode. In the ordinary transmitting operation, the transmission mode is started with this stored initial value (initialized value) of the phase. Since the stored initial value ensures the most stabilized phase for the feedback loop, the transmission performance suffering essentially no degradation can always be ensured for the output operation.

At this juncture, it should however be mentioned that rotation of the phase in the course of operation of the feedback loop in the closed loop state may possibly bring about instability in the feedback loop operation, giving rise to occurrence of oscillation. In the oscillation state, the output signal Q' (DC voltage) of the loop filter 3-2 deviates from the specified range of 2 V to 3 V (volts). If the phase control is carried out by using such deviated signal, a correct phase control becomes impossible. To cope with this problem, the control circuit 54 can be so programmed or designated as to monitor the range of the DC voltage values of the signal Q' through the medium of the A/D converter 56 for making decision as to whether or not the DC voltage of the signal Q' lies within the specified range. So long as the DC voltage of the signal Q' lies within the specified range, it is then decided that the feedback loop is operating in the normal state. Thus, the control circuit 54 fetches the detection output of the comparator 57 to effectuate the phase control. On the other hand, in case the DC voltage of the signal Q' falls outside of the specified range, it is decided that the feedback loop is in the oscillation state. In that case, the result of detection derived from the output of the comparator 57 at that phase position or time point is neglected, whereon the phase is shifted or changed to the succeeding phase value.

Figure 8:
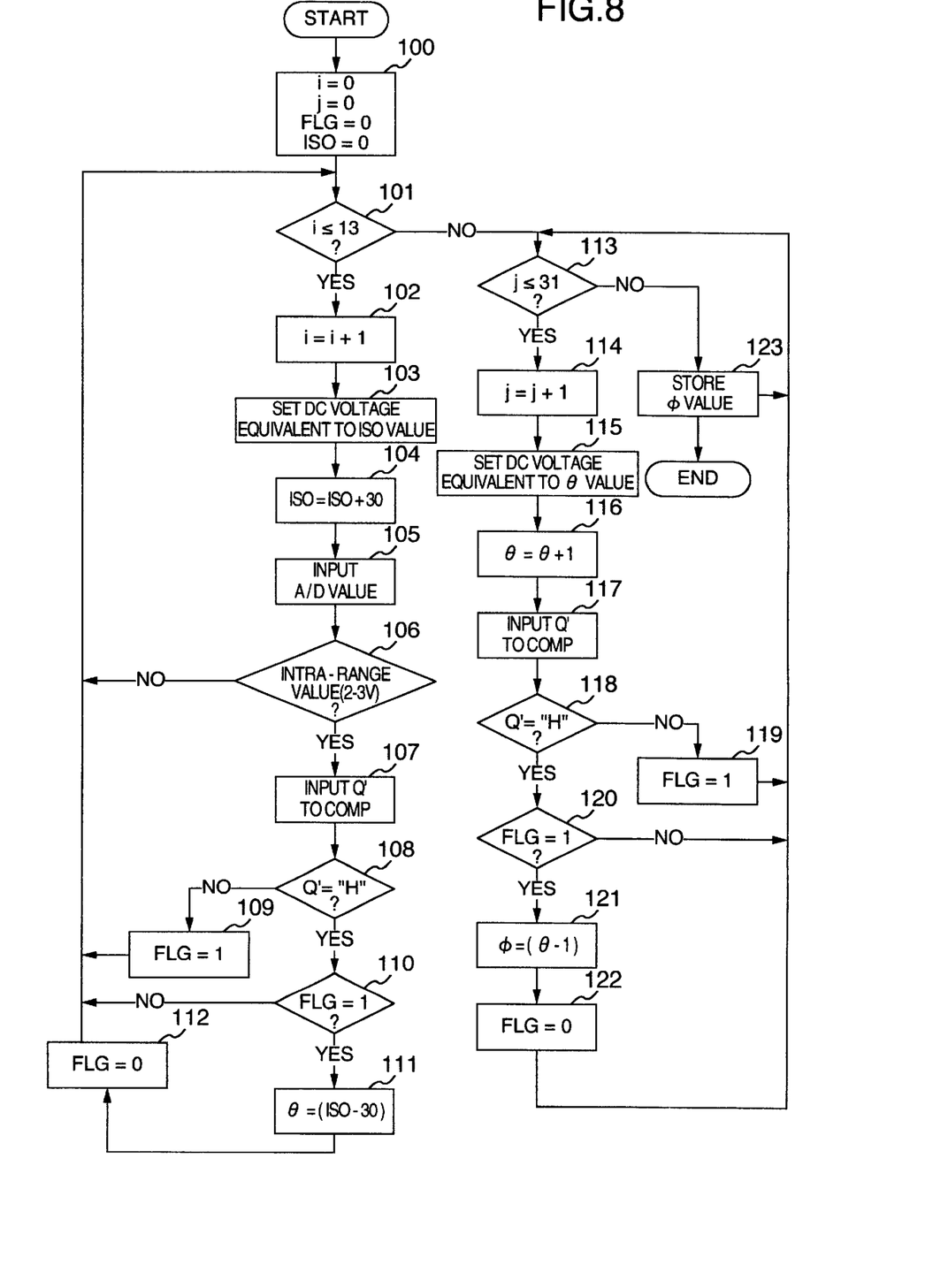
FIG. 8 is a flow chart for illustrating a typical phase control operation procedure according to an embodiment of the present invention.
Figure 9:
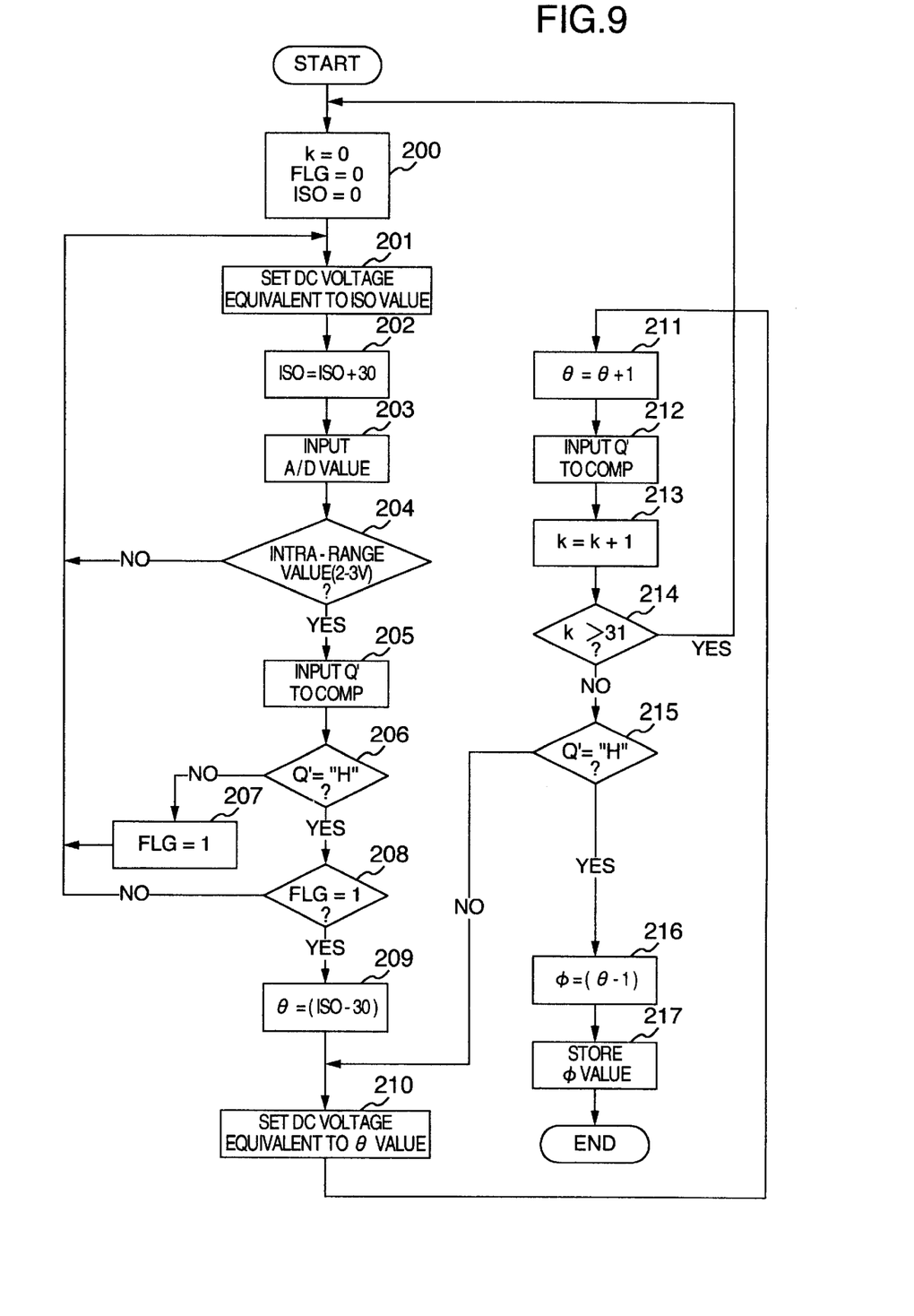
FIG. 9 is a flow chart for illustrating a typical phase control operation procedure according to another embodiment of the present invention.

Two typical operation procedures executed by the control circuit 54 which can be realized by a microcomputer and control software therefor are illustrated in flow charts shown in FIGS. 8 and 9, respectively. In the case of the operation procedure illustrated in the flow chart of FIG. 8, it is presumed that the phase rotation is performed over the whole range extending from 0° to 360°, whereas in the operation procedure illustrated in FIG. 9, it is presumed that at the time point when the output value of the comparator 57 changes from "Low (−)" to "High (+)", any further rotation of the phase angle is not effectuated.

Now, referring to FIG. 8, initialization processing is executed in a step 100. More specifically, i, j, FLG and ISO are initialized to zero, respectively. In this conjunction, i represents a counter value indicating the number of times the phase shift operation has been effected. In the case where the phase is sequentially shifted from 0° to 360° stepwise or incrementally on a 30°-by-30° basis, the counter value i reaches "13" upon phase rotation over 360°. On the other hand, j represents a counter value indicating the number of times the phase shift operation has been effected in the case where the phase shift operation is performed one by one degree. Thus, when the phase has been shifted from 270° to 300° on a 1°-by-1° basis, the counter value j indicates "31" upon phase rotation up to 300°. Further, FLG represents the flag to which "1" is set when the output of the comparator 57 changes from "Low" to "High". Finally, ISO represents a variable for making the phase change by 30°, and this indicates the phase value itself. The counter values i and j, the flag FLG and the variable ISO mentioned above can all be implemented by making use of memory functions such as register function.

In a step 101, decision is made as to whether or not $i \leq 13$. When this decision step 101 results in affirmation "Y" (i.e., when the phase rotation of 360° has not been completed yet), then the value of i is incremented by "1" (one) in a step 102. In a step 103, the DC voltage equivalent to the ISO value supplied to the phase shifter 18' is set by referencing the table shown in FIGS. 10A–10B. In a step 104, a value resulting from addition of "30" to the ISO value set in the step 103 is determined. In a step 105, the output of the A/D converter 56 is fetched. In a step 106, it is decided whether or not the output of the A/D converter 56 is in a normal range of 2 to 3 volts. In case the output of the A/D converter 56 exceeds the normal range, decision is then made that the oscillation state is taking place, whereon the step 101 is resumed. By contrast, when the output of the A/D converter 56 lies within the normal range, the processing proceeds to a step 107. In this step 107, output of the comparator 57 is fetched. In a succeeding step 108, decision is made as to whether or not the output of the comparator 57 is "High (+)". Unless the output of the comparator 57 is "High", the flag FLG is set to be "1" (i.e., FLG=1) in a step 109, whereon the step 101 is resumed. If otherwise, decision is made as to whether or not the FLG is "1" (i.e., FLG=1) in a step 110. When the FLG is "1", in a succeeding step 111, the value of θ is set to "ISO-30". When the FLG is "0", the step 101 is resumed. This process is made when the output of the comparator is initially "High". At first, when the output of the comparator is "Low", it is operated such that the FLG becomes "1". In this conjunction, the symbol θ represents the value of ISO when the output of the comparator 57 is "Low (−)" at a time point before the output of the comparator 57 changes from "Low (−)" to "High (+)". Incidentally, the value of θ is recorded in the register. By way of example, assuming that the output of the comparator 57 changes from "Low (−)" to "High (+)" when the phase changes from 30° to 60°, the value of ISO when the phase is 30° is recorded in the register. In a step 112, the flag FLG is reset to "0".

When it is decided in the step 101 that $i \leq 13$ is not satisfied (i.e., when this decision step 101 results in negation "N"), indicating that the phase rotation of 360° has been completed, then decision is made in a step 113 as to whether or not the condition that $j \leq 31$ is satisfied. When this decision step 113 results in affirmation "Yes" (i.e., when the 1°-by-1° phase rotation has not been completed thoroughly), then the value of j is incremented by "1" (one) in a step 114. In a step 115, the DC voltage equivalent to the θ value to be supplied to the phase shifter 18' is set by referencing the table shown in FIGS. 10A–10B. In a step 116, the value resulting from addition of the θ value set in the step 115 with "1" is determined. In a step 117, output of the comparator 57 is fetched. In a succeeding step 118, decision is made as to whether or not the output of the comparator 57 is "High (+)". Unless the output of the comparator 57 is "High", the flag FLG is "1" (i.e., FLG=1) in a step 119, whereon the step 101 is resumed. If otherwise, it is decided in a step 120 whether or not the flag FLG is "1" (i.e., FLG=1). When the FLG is "1", in a succeeding step 121, the value of φ is set to "θ−1". When the FLG is "0", the step 113 is resumed. In this conjunction, the symbol φ represents the value of θ when the phase value θ is "Low (−)" at a time point before the phase value θ changes from "Low (−)" to "High (+)". The value of φ is recorded in the register. Further, in a step 122, the flag FLG is reset to "0". When the decision step 113 results in that the value j exceeds "31", then the value of φ is recorded in the register in a step 123 and the process is completed.

Next, referring to the flow chart shown in FIG. 9, description will be directed to an example of such phase control that at the time point when the output value of the comparator 57 has changed from "Low (−)" to "High (+)", rotation of the phase angle is not performed any further. In a step 200, k, FLG and ISO are all initialized to zero "0". In this conjunction, k represents a count value of a counter prepared for preventing erroneous operation from taking place when the phase is being changed or shifted on a one-by-one degree basis. In the case of the phase control illustrated in FIG. 9, the phase shift operation is not terminated until the correct phase has been found or detected. Accordingly, in order to cope with erroneous operation taking place in the course of the phase shift operation, the value of k is checked to thereby terminate forcibly the phase shift (or change) operation when k has reached a preset value. In the case of the phase control now under discussion, the phase shift operation is reset to the initial state. Now referring to FIG. 9, in a step 201, the DC voltage equivalent to the ISO value supplied to the phase shifter 18' is set by referencing the table shown in FIGS. 10A–10B. In a step 202, the value resulting from addition of the ISO value set in the step 201 with "30" is determined. In a step 203, output of the A/D converter 56 is fetched. In a step 204, it is decided whether or not the output of the A/D converter 56 is in a normal range of 2 to 3 volts. In case the output of the A/D converter 56 exceeds the normal range, it is then determined that the oscillation state is taking place, whereon the step 201 is resumed. By contrast, when the output of the A/D converter 56 lies within the normal range, the processing proceeds to a step 205. In this step 205, output of the comparator 57 is fetched. In a succeeding step 206, decision is made as to whether or not the output of the comparator 57 is "High (+)". Unless the output of the comparator 57 is "High", the flag FLG is left to be "1" (i.e., FLG=1) in a step 207, whereon the step 201 is resumed. When the output is "High", decision is made as to whether or not, the flag FLG "1" (i.e., FLG=1) in a step 208. When the FLG is "1", in a succeeding step 209, the value of θ is set to "ISO-30". In a step 210, the DC voltage equivalent to the value of θ determined in the step 209 is set. In a step 211, the value resulting from addition of the value θ with "1" is determined. In a step 212, the output of the comparator 57 is fetched. In a step 213, the value of k is incremented by "1" (one). In a step 214, it is decided whether or not the value of k is greater than "31". If this decision results in affirmation "Y", the step 200 is resumed. Otherwise, it is decided in a step 215 whether or not the output of the comparator 57 is "High (+)". When the output is "High", in a step 216, the value of ϕ is set to (θ−1). Finally, the value of ϕ is recorded in the register in a step 217, whereupon the phase control procedure comes to an end.

In the case of the negative feedback amplifier described above, when the phase is rotated in the I-Q coordinate system counterclockwise from 0° to 360° on a 30°-by-30° basis, as is shown in the table of FIG. 4, there exists a point at which the phase coincidence occurs within the range in which the phase changes from 270° to 300°.

Subsequently, at a time point where the output of the comparator 57 changes the polarity thereof from minus (−) to plus (+), e.g. within an range of the phase change from 270° to 300°), then the phase is changed, e.g. on a 1°-by-1° basis, as is shown in FIG. 5, for thereby determining the value of the component Q' and hence detecting the Q-component at the input Q' of the quadrature modulator 4 by observing the output of the loop filter 3-2 with the phase controller 17. In that case, the phase at the time point when the output of the comparator 57 changes minus (−) polarity to plus (+) polarity is selected as the correct phase on the basis of which the phase shift quantity is fixedly determined by means of the phase shifter 18'.

To say in another way, in the exemplary case described above by reference to FIGS. 4 to 5, when the phase is shifted or changed on a 30°-by-30° basis, the polarity of the output of the comparator 57 changes from minus (−) to plus (+) within the phase range of 270° to 300°. Thus, it can be determined that the correct phase exists within this phase range. Consequently, by shifting in succession the phase one by one degree within the range of 270° to 300°, the phase value can be determined specifically or definitely.

When the value by which the carrier signal LO1 to be shifted by means of the phase shifter 18' is set on the basis of the correct phase determined through the procedure described above, the switch 20 is then changed over to couple the output of the amplifying circuit 8 to the antenna 9 for allowing the transmission to be started in the ordinary transmission mode. Incidentally, it should be added that upon starting of the transmission, the signal of the I-component and the Q-component of the information for transmission is supplied from the baseband signal generator 1.

Since the phase shift quantity to be effectuated by the phase shifter 18' as determined in the test mode can be saved or stored, for example, in a memory (not shown) as a preset value for the phase shifter 18', the succeeding transmitting operation can be carried out with this phase shift quantity upon starting thereof. It should however be mentioned that the phase shift quantity determined in the test mode may also be saved in the phase controller 17 for controlling the phase shifter 18' as an alternative of the process described above.

The mode changeover between the transmission mode and the test mode can be conducted by an operator of the transmitter or radio system as occasion demands. By way of example, the system setup may be done such that the test mode is executed automatically firstly upon operation starting, which mode is then automatically changed over to the transmission mode. In other words, various mode changeover methods may selectively be adopted rather arbitrarily.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the negative feedback amplifier described above, the phase is firstly shifted at the rate of 30° and then at the rate of 1°. In other words, the phase shifting operation is effected twice. However, it goes without saying that the phase shifting operation may be carried at the rate of 1° (i.e., on a 1°-by-1° basis) throughout. Alternatively, the phase shifting operation may be carried out divisionally at three or more different rates, respectively. Furthermore, the invention is never restricted to the shifting rates of 30° and 1° but any other appropriate rate(s) may be adopted, needless to say.

Further, in the negative feedback amplifier described above, the DC voltages of I=3.0 volts and Q=2.5 volts are outputted from the baseband signal generator 1, wherein the Q-output component Q' of the loop filter 3-2 is checked or monitored. However, such arrangement may equally be adopted that the DC voltages I=2.5 volts and Q=3.0 volts are outputted from the baseband signal generator 1, wherein the I-output component I' of the loop filter 3-1 is monitored by the phase controller 17. Besides, it can readily be appreciated that every time the phase shifting rate is changed, the Q-output component signal Q' or alternatively the I-output component signal I' may be checked or monitored without departing from the spirit and scope of the present invention.

Furthermore, in the negative feedback amplifier described above, it has been presumed that the phase rotation is effected counterclockwise, wherein the phase at which the Q-component signal Q' outputted from the comparator 57 changes polarity from minus (−) to plus (+) is detected as the intra-loop correct phase. However, it is equally possible to rotate the phase clockwise to determine the phase at which the comparator output changes polarity from plus (+) to minus (−) as the correct phase.

Additionally, it should be mentioned that although the change of plus (+) polarity to minus (−) one or vice versa is observed for determining or detecting the correct phase, it goes without saying that the correct phase detection can also be made by resorting to the other decision reference based on signal pattern, voltage range or the like.

The phase control method according to the present invention can advantageously be carried out for phase adjustment of the transmitter equipped with the inventive negative feedback amplifier preferably in precedence to shipping of the transmitter from factory. Furthermore, it should also be added that the power amplifier and the phase control method according to the present invention can be implemented for practical applications in combination with the phase control method disclosed in the copending U.S. patent application Ser. No. 09/672,688. In that case, the initialization of the transmitter may be executed in accordance with the phase control method of the present invention, while correction of the phase deviation taking place during operation of the transmitter may be carried out in accordance with the phase control method disclosed in the preceding patent application mentioned just above.

As will now be appreciated from the foregoing, according to the teachings of the present invention disclosed herein, it is possible to perform the phase adjustment in the closed state of the Cartesian loop, which in turn means that the components or constituents otherwise required for changing over the Cartesian loop to the opened state can be spared advantageously. By virtue of this feature, variation of the offset voltage can be suppressed to a minimum, while ensuring stabilization of the transmission characteristics as well as reduction of the circuit scale.

Many modifications and variations of the present invention are possible in the light of the above techniques. It is therefore to be understood that within the scope of the appended claims, the invention may be practiced otherwise than as specifically described.

What is claimed is:

1. A power amplifier circuit having a negative feedback circuit for a transmitter, comprising:

an input terminal for inputting an I-component test signal for an I-component baseband signal and a Q-component test signal for a Q-component baseband signal;

an adder coupled to said input terminal for adding said I-component test signal and an I-component baseband feedback signal to generate an I-component summing signal, and adding said Q-component test signal and a Q-component baseband feedback signal to generate a Q-component summing signal;

an oscillator for generating a carrier signal;

a modulator for orthogonally modulating said carrier signal with said I-component summing signal and said Q-component summing signal;

an amplifying circuit coupled to said modulator for amplifying the orthogonally modulated signal;

a demodulating circuit coupled to said amplifying circuit for orthogonally demodulating said orthogonally modulated signal by using a part of an output of said amplifying circuit and said carrier signal to output said I-component baseband feedback signal and said Q-component baseband feedback signal;

a phase control circuit for generating a phase control signal, to which said I-component and Q-component test signals and one of said I-component and Q-component summing signals are applied;

a phase shifter coupled to said demodulating circuit, for changing the phase of said carrier signal outputted for said oscillator in accordance with said phase control signal; and said phase control circuit controlling said phase shifter so that the phase of said carrier signal meets a predetermined condition.

2. A power amplifier circuit according to claim 1, wherein said phase control circuit includes a comparator for comparing either one of said I-component and Q-component summing signals with a predetermined reference signal, said comparator being so constructed as to detect whether one of said I-component and Q-component summing signals is greater or smaller than said predetermined reference signal, and said phase control circuit holds the phase of said carrier signal based on the output of said comparison.

3. A power amplifier circuit according to claim 2, wherein said phase control circuit is so designed as to generated the phase control signal which changes sequentially the phase of said carrier signal stepwise by a predetermined phase angle.

4. A power amplifier circuit according to claim 3, wherein said phase control circuit performs coarse and fine regulating operations, respectively, in changing sequentially the phase of said carrier signal.

5. A power amplifier circuit according to claim 1, wherein said phase control circuit includes a memory storing a data table having values of the control signal which correspond to values of the phase angle of said carrier signal, respectively, and is designed to generate said phase control signal for changing sequentially the phase of said carrier single in accordance with said data table.

6. A power amplifier circuit according to claim 1, wherein said I-component test signal and said Q-component test signal are DC voltage signals of values differing from each other.

7. A power amplifier circuit according to claim 1, wherein said phase control circuit further includes:

decision means for making decision whether or not one of said I-component and Q-component summing signals exceeds a predetermined voltage, and inhibit means for invalidating the output signal of said comparator when one of said I-component and Q-component summing signals exceeds said predetermined voltage range.

8. A power amplifier circuit according to claim 2, wherein said phase control circuit is designed to generate the phase control signal which changes the phase of said carrier signal over 360° from an initial phase value stepwise by a predetermined phase angle.

9. A power amplifier circuit according to claim 8, wherein said phase control circuit is designed to generate the phase control signal for changing the phase of said carrier signal counterclockwise in an I-Q signal orthogonal coordinate system, and the phase of said carrier signal is held when one of said I-component and Q-component summing signals changes from low signal level to high signal level in comparison with said predetermined reference signal.

10. A power amplifier circuit according to claim 8, wherein said phase control circuit is designed to generate the phase control signal for changing the phase of said carrier signal clockwise in an I-Q signal orthogonal coordinate system, and the phase of said carrier signal is held when one of said I-component and Q-component summing signals changes from high signal level to low signal level in comparison with said predetermined reference signal.

11. A phase control method for a power amplifier circuit having a negative feedback circuit for a transmitter, comprising the steps of:

receiving an I-component baseband signal and a Q-component test signal for a Q-component baseband signal;

adding said I-component test signal and an I-component baseband feedback signal for generating an I-component summing signal, and adding said Q-component test signal and a Q-component baseband feedback signal for generating a Q-component summing signal;

modulating orthogonally a carrier signal outputted from an oscillator with said I-component and Q-component summing signals;

amplifying the orthogonally modulated signal;

demodulating orthogonally said orthogonally modulated signal by using a part of the amplified signal and said carrier signal to output said I-component and Q-component baseband feedback signals;

generating a phase control signal for changing the phase of said carrier signal based on said I-component and Q-component test signals and one of said I-component and Q-component summing signal; and changing the phase of said carrier signal outputted from said oscillator in accordance with said phase control signal, so that the phase of said carrier signal meets a predetermined condition.

* * * * *